Dec. 10, 1929.   K. A. WEBER   1,738,545
WINDSHIELD WIPER
Filed Jan. 16, 1929
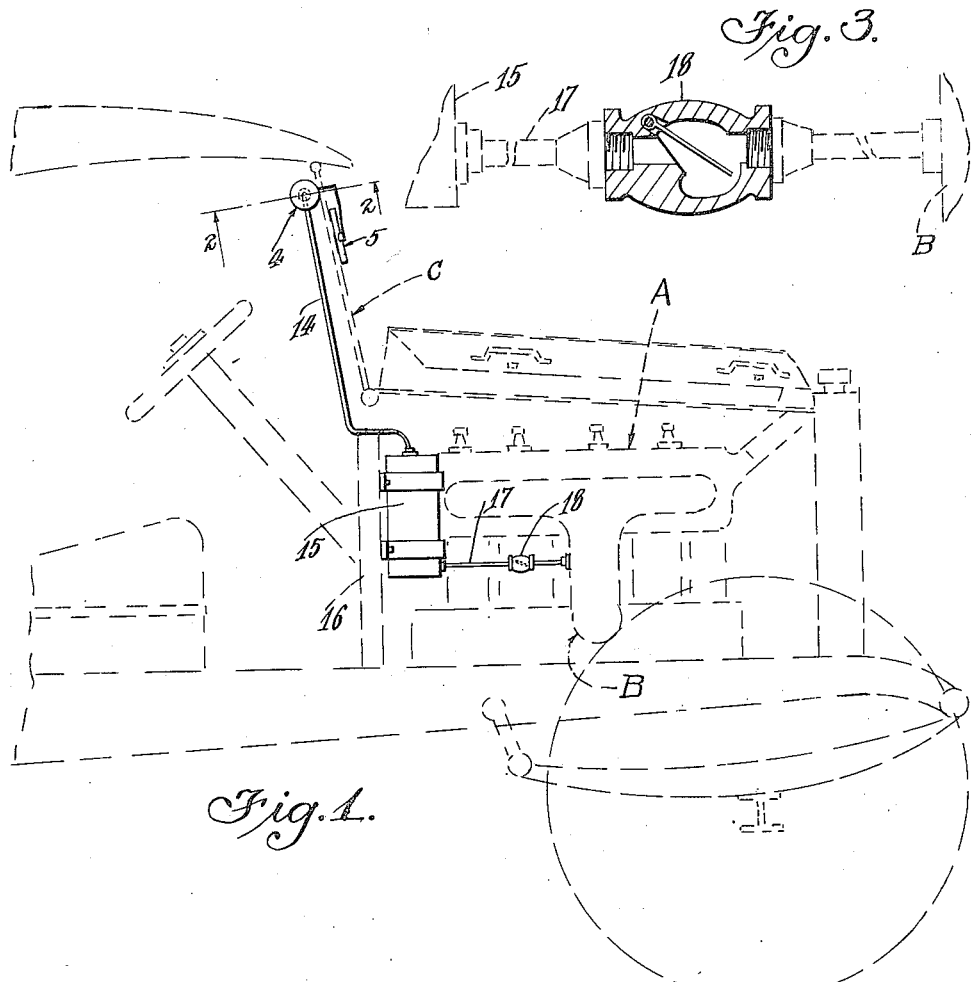
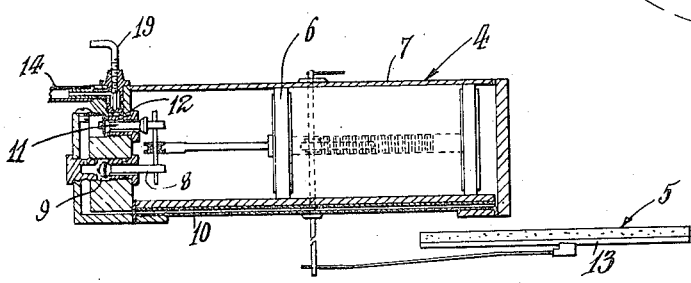
Inventor
Karl Albert Weber
By Lyon & Lyon
Attorneys Patented Dec. 10, 1929

1,738,545

UNITED STATES PATENT OFFICE

KARL ALBERT WEBER, OF LOS ANGELES, CALIFORNIA

WINDSHIELD WIPER

Application filed January 16, 1929. Serial No. 332,908.

This invention relates to windshield wiping apparatus and, more especially, to that type of wiping apparatus that is operated by differential pressure, due to a reduction of pressure on one side of a piston, said reduction in pressure being produced by connecting the differential pressure motor cylinder with the intake manifold of the internal combustion engine that drives an automobile, on which the windshield wiping apparatus is installed.

An important object of this invention is to maintain the wiper in operation when, for any reason, the partial vacuum in the intake manifold falls to a degree below that required for operation of the differential pressure motor.

The ordinary vacuum-operated windshield wiper, since it depends for operation upon the partial vacuum established in the intake manifold by operation of the internal combustion engine, ceases to function when the engine is subjected to a heavy load with the throttle wide open as, for example, when the automobile is climbing a relatively steep grade. This invention provides for the maintenance of a reduced pressure in a tank so that upon a reduction in pressure to a predetermined degree in the intake manifold, the reduced pressure in the tank will become operative to maintain the differential-pressure-operated motor in operation. The utility of the invention will be recognized when it is considered that the discontinuance of operation of the windshield wiper for only a few seconds in a heavy fog or rain storm may be dangerous for the occupants of the automobile, since the driver thereof, because of the obscuration of the windshield, cannot properly see the road on which the automobile is being driven.

Other objects and advantages will appear in the subjoined detailed description.

The accompanying drawings illustrate the invention.

Figure 1 is a side view of a windshield wiping apparatus constructed in accordance with the provisions of this invention and mounted in place of an automobile, which is fragmentarily shown in dotted lines.

Fig. 2 is an enlarged horizontal section on the line indicated by 2—2 of Fig. 1.

Fig. 3 is a broken view of the pipe line, tank and intake manifold, the check valve being shown in section.

Referring to the drawings, an internal combustion engine is indicated in general by the character A, the intake manifold thereof being indicated at B. A windshield is indicated at C, said windshield being provided with a differential-pressure-operated motor 4 of any suitable construction, there being operably connected to said motor a wiper member 5.

The construction of the motor 4 need not be fully described in detail herein, as it is of a type in general use. However, some of the details of the motor are illustrated in Fig. 2, such, for example, as the piston 6 working in the cylinder 7, the air inlet valve 8 that controls the air inlet port 9, the duct 10 that communicates the port 9 with the opposite end of the cylinder, and the valve 11 that controls the port 12. The motor 4 operates the wiper bar or member 13 in a manner well understood in this art.

Air is withdrawn from the cylinder 4 through the port 12, when the valve 11 is open, by a tube 14 which connects with a tank 15 that may be mounted in any suitable manner on the automobile. In this instance the tank 15 is mounted on the dash 16. Connecting the tank 15 to the intake manifold B is a pipe line 17 in which is a check valve 18. The check valve 18 is illustrated in detail in Fig. 3 and said check valve may be of any suitable construction, and it is positioned so that it closes in a direction toward the tank 15 and opens in a direction away from said tank.

The invention operates as follows: Assuming that the engine is operating under relatively light load conditions, as would be the case, for example, if the automobile were running on a substantially level, smooth roadway, the pressure in the intake manifold B will be lowered considerably, thus lowering the pressure in the pipe line 17, tank 15 and tube 14. Assuming that the valve 19, that controls the flow of air out of the cylinder into the tube 14, has been opened, the reduction of pressure in the tube 14 will cause operation of the motor 4, in a manner well understood in this art, thus operating the wiper member 13. Under such conditions of operation, the reduction of pressure that is effected in the tank 15 is greater than that required for operation of the motor 4.

Now assuming that the automobile is driven with open throttle up a grade, pressure in the pipe line 17 on the right of the valve 18 will be greater than the pressure within the tank 15 and, accordingly, the check valve will be closed by the differential pressure. If the tank 15 is of two or three-gallon capacity, the wiper member will be maintained in operation for approximately thirty seconds. When the automobile has passed the top of the grade, a greater reduction in pressure in the intake manifold will ensue and, when said pressure is slightly less than the pressure on the left of the check valve 18, said valve will open so as to maintain the motor 4 in operation and build up a reserve partial vacuum in the tank 15 for future use in operating the motor 4, when, for any reason, the pressure in the intake manifold increases to a degree that would entail discontinuance of operation of the motor 4.

I claim:

A windshield wiping apparatus comprising a tank, a pipe line for connecting the tank with the intake manifold of an internal combustion engine, a check valve in said pipe line opening in a direction away from the tank, a differential pressure-operated motor, a wiper member operably connected with said motor, and a pipe line connecting the tank with the motor.

Signed at Los Angeles, California, this 11th day of January, 1929.

KARL ALBERT WEBER.